United States Patent [19]
Jansen

[11] Patent Number: 5,217,509
[45] Date of Patent: Jun. 8, 1993

[54] FILTRATION SYSTEM

[75] Inventor: Gary D. Jansen, Asheboro, N.C.

[73] Assignee: Industrial Air, Inc., Greensboro, N.C.

[21] Appl. No.: 863,437

[22] Filed: Apr. 3, 1992

[51] Int. Cl.⁵ .................. B01D 29/68; B01D 29/03
[52] U.S. Cl. .................................. 55/96; 55/283; 55/302
[58] Field of Search .............. 55/96, 283, 284, 302

[56] References Cited

U.S. PATENT DOCUMENTS

| | | | |
|---|---|---|---|
| 3,086,891 | 4/1963 | McEachern | 55/302 X |
| 3,097,938 | 7/1963 | Weller | 55/302 |
| 3,188,680 | 6/1965 | Black, Jr. | 55/302 X |
| 3,251,175 | 5/1966 | Black, Jr. | 55/302 X |
| 3,373,545 | 3/1968 | Christianson | 55/302 X |
| 3,424,501 | 1/1969 | Young | 55/302 X |
| 3,486,309 | 12/1969 | Wild | 55/302 X |
| 3,612,616 | 10/1971 | Stewart | 55/302 X |
| 3,646,595 | 2/1972 | Williams | 55/302 X |
| 3,762,143 | 10/1973 | Stewart | 55/283 X |
| 3,951,623 | 4/1976 | Furstenberg | 55/96 |
| 3,975,173 | 8/1976 | Peterson et al. | 55/96 |
| 4,199,333 | 4/1980 | Ferri et al. | 55/302 X |
| 4,227,900 | 10/1980 | Nichols et al. | 55/302 X |
| 4,502,874 | 3/1985 | Levie et al. | 55/283 |
| 4,636,301 | 1/1987 | Laramore | 55/284 X |
| 4,692,173 | 9/1987 | Roos | 55/96 |
| 4,895,581 | 1/1990 | Starling | 55/283 |
| 4,923,068 | 5/1990 | Crowson | 55/96 X |
| 5,108,473 | 4/1992 | Hayden, Sr. | 55/302 |

Primary Examiner—Robert Spitzer
Attorney, Agent, or Firm—Rhodes, Coats & Bennett

[57] ABSTRACT

A single high vacuum pump is connected to the downstream side of a pair of filtration chambers for collecting solid constituents from one or more pickup points upstream of the filtration chambers, entraining such solid constituents in a collection airstream, and separating the solid constituents from the airstream in the filtration chambers. Periodically, the filter screen of each filtration chamber is backflushed by a system of control valves which shut off the collection airstream thereto, opens the bottom gate of the filtration chamber to dump the accumulated constituents therefrom, and generates a reverse airflow path through the filter screen of the filtration chamber being cleaned. The reverse airflow path is then transferred to the other filtration chamber and through the filter screen thereof in the normal forward direction. Both the collection airstream and the reverse airflow are generated by the same high vacuum pump.

4 Claims, 3 Drawing Sheets

FILTRATION SYSTEM

BACKGROUND OF THE INVENTION

The present invention is directed to industrial filtration systems and, more particularly, to a technique for cleaning air filters of the type which are utilized to collect textile waste such as dust, lint, fibrous materials and the like from airstreams contaminated therewith. The air filters of the present invention are so constructed as to be mounted in a pair and subjected to a backflow of air therethrough induced by the same high vacuum pump that generates the normal airflow path.

Modern industrial environments require conditioning of the air space therein from the standpoint of several characteristics. Various reasons exist behind these conditioning requirements. Often the manufacturing or industrial operations being carried on in the workplace dictate a certain temperature, humidity, or maximum level of contaminants in the air. Health and safety regulations now require that the environment in which workers perform their tasks be free of unhealthy contaminants. Textile lint and waste is considered to be one of the most dangerous of these contaminants which should be removed. If the various areas on which lint and waste collect can be automatically cleaned and the lint, waste and dust removed, it is less likely to become entrained in the air and thus become a health hazard to personnel.

One specific example of an industrial application in which recent health and safety standards have required a reduction in the level of airborne particulates is in the processing of cotton. For decades cotton mills, in which raw cotton is opened, combed, carded and spun into yarn, have been one of the most contaminated, unhealthy environments in which an industrial worker could possibly exist. Numerous cases of brown lung traced their causes to the cotton mill. Other industrial environments are similarly required to be cleaned in accordance with contemporary health and safety standards. In such environments as the cotton mill, the amount of lint, waste, fibers, and dust generated is of such magnitude that continuous cleaning and filtering of the air is required. The airstream which is generated to collect and entrain such contaminants from various places is delivered to some type of filter or collection system. The entire system conceptually resembles a large vacuum cleaner with a plurality of pickup heads. Lint, waste, fibers, and dust are continuously picked up from various points and transmitted to one or more filter apparatuses or "receivers" where the air entrained solid constituents are separated from the airstream by a filter screen. The clean air is then exhausted and the solid constituents collected.

In some systems, it has become an accepted practice to use a high vacuum pump to generate a sufficient vacuum to pick up such constituents from various places throughout the factory. The contaminants are carried through a conduit and delivered to one of two receivers or filter chambers which are loaded evenly and alternatively. The output of each receiver is connected to the high vacuum pump, so that the same pump brings in contaminated air to both receivers and exhausts air therefrom. In such embodiments, it is necessary to periodically dump the solid constituents collected on the screen and backflush the screen. In known systems, such backflushing has occurred or been effected by the use of compressed air from separate sources.

In the past, filter apparatuses have been utilized in which a dirty air stream is delivered to one of two or more filter sections of a filter housing. By some type of baffling system, alternate sections of the housing are used for collection, while other portions of the housing are backflushed by a separate energy source. Examples of such systems are illustrated in U.S. Pat. No. 4,778,491 to Yow; U.S. Pat. No. 4,372,713 to Kean, Jr.; U.S. Pat. No. 729,527 to Titgen; and British Patent No. 546,878 to Thomas Ash & Company. One other system is illustrated in British Patent No. 778,537 to Klockner et al. in which is shown two separate passageways, each of which includes a filter. During normal operation, the dirty airstream passes in one direction, however, during the cleaning operation, air is passed in the opposite direction to backflush the screen. However, a separate blower 24 is utilized for backflushing while a vacuum fan is used for normal operation. This is the type of system referred to earlier in which separate energy sources are used for the cleaning operation and the backflushing operation.

In one other approach described in U.S. Pat. Nos. 1,493,110 to Diehl and 2,836,256 to Caskey, parallel filter paths are established. Then a portion of the outflowing air, downstream of the filter screen, is diverted back to be used in a backflushing operation for the other screen. This has proven to be inadequate as far as providing sufficient suction for efficient backflushing operations in which the cleaned screen is not only backflushed, but the resulting airstream therefrom is to be diverted to and through the other filter chamber.

SUMMARY OF THE PRESENT INVENTION

In the present invention, on the other hand, there is also provided a filter system in which there are two separate filter chambers. Only one high vacuum pump is used, however, to draw air into and through the two filter chambers from a plurality of pickup points. The two filter chambers are loaded alternately and substantially evenly. Then, during a dump cycle, the input air to both chambers is shut off and each filter chamber is cleaned successively. In the filter chamber to be cleaned (first chamber), the normal air outlet is shut off and an auxiliary vent to the atmosphere is opened at a point downstream of the filter screen. A crossover conduit connects the two filter chambers at a point upstream of the filter screens, and a crossover valve allows the high vacuum pump to pull air from the vent backwards through the screen of the first chamber, through the crossover passageway, and into the other filter chamber at a point upstream of the screen. The air then passes on through the outlet of the other chamber to the high vacuum pump. The valving is then reversed so that the second filter chamber may be cleaned, while the air passageway to the pump is connected through the first filter chamber.

With this system, a single high vacuum pump can be used to collect lint, waste, dust and other solid constituents from a variety of points from whence they are delivered through a common duct to one of a pair of filter chambers. By means of the simple crossover conduit and valve and associated control system, the cleaning and backflushing operation can be effected. There is no need for one or more additional sources of compressed air which add to the expense and operating cost of the system.

The high vacuum filter apparatus of the present invention collects and separates air entrained solid constituents from an incoming airstream which transmits such constituents from one or more pickup points. The apparatus includes a pair of filtration chambers and a normally closed crossover air passageway therebetween. Each of the filtration chambers includes a housing with a filter screen therein, an air inlet on the upstream side of the filter screen having a shutoff valve associated therewith for selectively receiving the incoming airstream. An air outlet is positioned on the downstream side of the filter screen and it too includes a shutoff valve associated therewith. A fresh air inlet on the downstream side of the filter screen includes its own fresh air inlet shutoff valve. A duct means delivers the incoming airstream alternately and substantially evenly to the upstream air inlets of the filter chambers. A high vacuum pump having the capacity of generating a vacuum in the range of 10-13 inches of mercury is positioned downstream of the air outlets. A valve in the crossover air passageway selectively opens and closes the air path between the filtration chambers.

By selective manipulation of the valves, backflushing of the filter screen in one filter chamber may be effected by closing both upstream air inlets, closing the downstream air outlet of one filtration chamber, opening the downstream fresh air inlet on the one filtration chamber, and opening the valve in the crossover air passageway. The high vacuum pump will then draw in fresh air to the downstream side of the one filtration chamber, through the screen thereof in a reverse direction to backflush, through the crossover passageway, into and back through the screen of the other filtration chamber, and on to the pump.

It is therefore an object of the present invention to provide an improved high vacuum filter apparatus for collecting and separating air entrained solid constituents from an incoming airstream which transmits the constituents from one or more pickup points.

It is a further object of the present invention to provide a high vacuum filter apparatus of the type described in which the only energy input is a single high vacuum pump having a capacity of generating a vacuum in the range of 10-13 inches of mercury.

It is another object of the present invention to provide an improved method for collecting and separating air entrained solid constituents from an incoming airstream which delivers the solid constituents from one or more pickup points.

Another object of the present invention is to provide a new improved filtration chamber for separating air entrained solid constituents from an incoming airstream, which filtration chamber may be interconnected with a similar filtration chamber to effect cleaning and backflushing of the filter screen therein.

Other objects and a fuller understanding of the invention will become apparent from reading the following detailed description of a preferred embodiment along with the accompanying drawings in which.

DETAILED DESCRIPTION OF A PREFERRED EMBODIMENT

Figure 1:
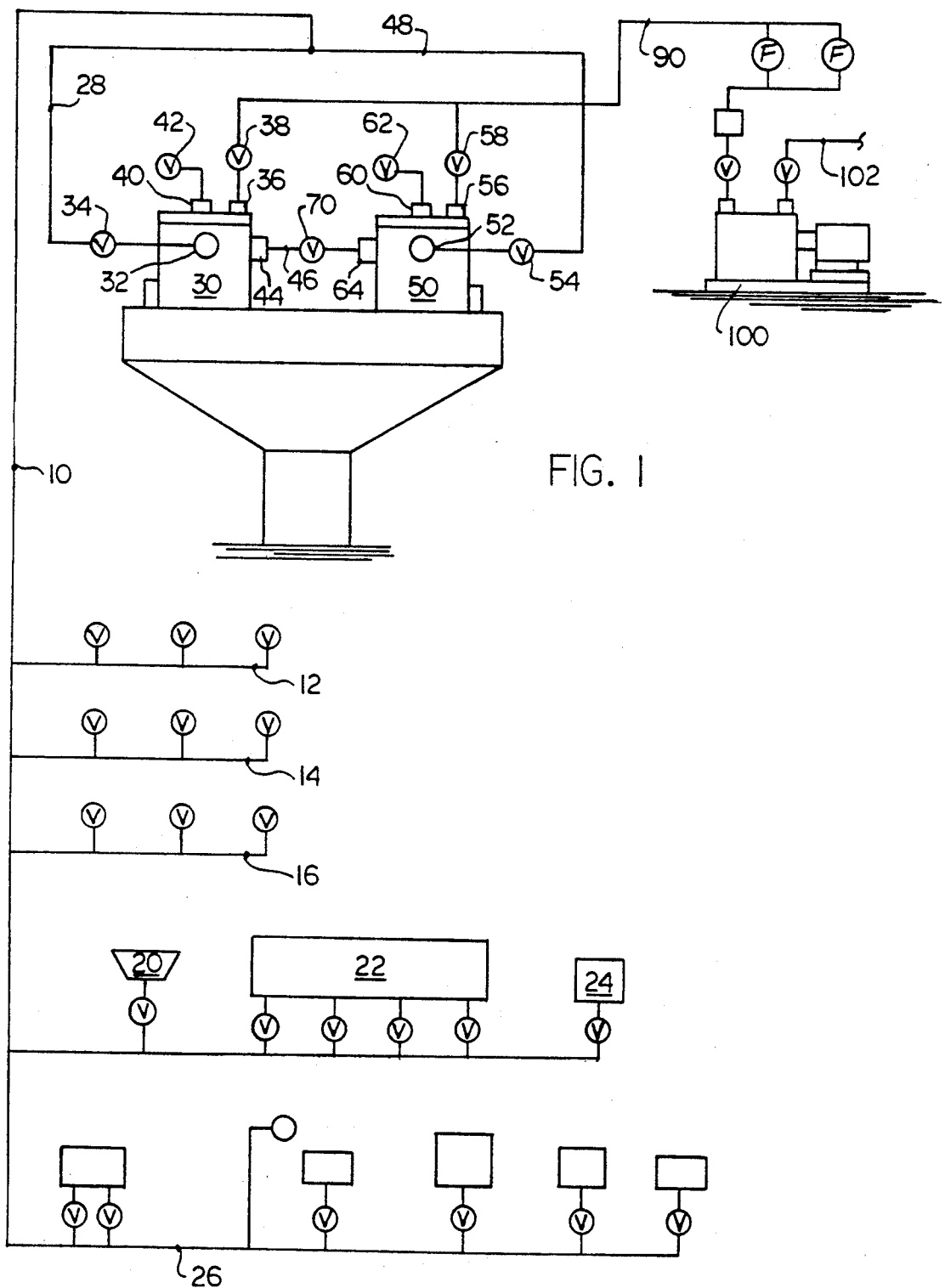
FIG. 1 is a schematic representation of the dual receiver filter system in its intended environment.

Turning now to the drawings, in FIG. 1, there is illustrated schematically a waste collection system for an industrial plant which generates airborne particle at operating stations. For example, in a textile plant, lint, waste, fibers, and other contaminants become entrained in the air as a result of the operations necessary to convert various fibers to yarn. Such contaminating particles are very dangerous to workers in the environment, and it is extremely important to remove these airborne particles as quickly as possible. For this purpose, entire systems have been developed which pick up the lint, fibers and waste at a plurality of points.

One such exemplary system is shown in FIG. 1 which includes a main contaminated air line 10 which picks up contaminated particles from a variety of operating stations. For example, lines 12, 14 and 16 are connected to a plurality of cards. One or more suction inlets are positioned at various points on and around the card to remove deposits of lint, fibers and waste after they accumulate at a collection point. These contaminating particles are conducted through the branch lines 12, 14 and 16 to the main line 10. In branch line 18, contaminated particles are picked up from condensers 20, fiber separators 22, and from the opening room filter 24. In yet another branch line 26, waste and fibers are collected and transmitted from other equipment generating lint and waste into the main line 10.

The waste and fibers are collected and intermittently conducted through main line 10 to receivers 30,50, where further separation of air from contaminating particles occurs. The collected contaminating particles are dropped into hopper 80, and the clean air is passed outwardly from receivers 30,50 into outgoing line 90 then alternating floor filters and to a high pressure vacuum pump 100 which provides the source of vacuum for the entire system. After the clean air passes through the high capacity vacuum pump 100, it is delivered to the outside environment through outlet 102.

As described hereinabove, and as better shown in FIG. 2, each receiver 30,50 includes a bottom gate 30b,50b which may be selectively opened to drop the collected contaminating particles from the chamber thereabove. A filter screen 30c,30c extends diametrically across each chamber near the upper end thereof and separates the contaminating particles from the airstream. Periodically, the particles are dumped from each chamber and then the screens 30c,50c must be cleaned by backflushing. In previous systems, separate sources of compressed air have been provided for the backflushing operation. In the ensuing discussion, there is described the system and its operation according to the present invention, whereby the lone or single high vacuum pump 100 may be used in conjunction with a series of sequentially controlled valves to periodically conduct the backflushing operation.

DUAL RECEIVER SYSTEM

Figure 2:
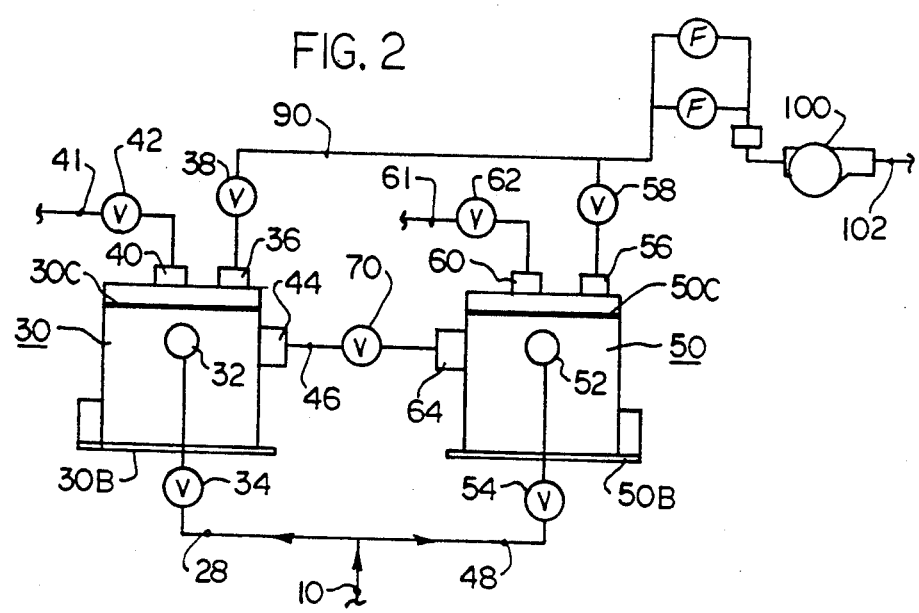
FIG. 2 is an enlarged schematic representation of the receiver portion alone of the filter system.
Figure 3:
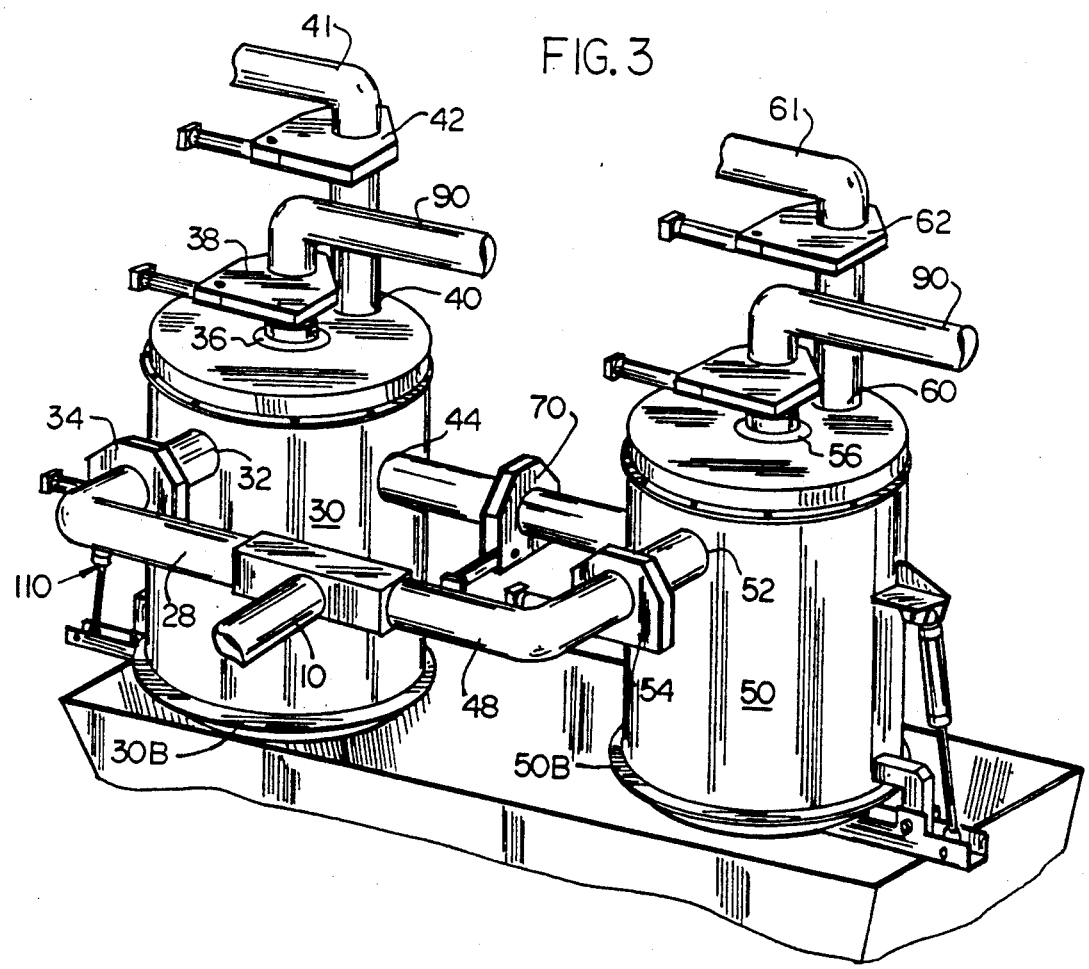
FIG. 3 is a perspective view of the dual receivers.

As better shown in FIGS. 2 and 3, air from the incoming air line 10 is divided into two branches 28,48. The contaminated air delivered through branch 28 enters receiver 30 through inlet 32. A shutoff valve 34, controlled as described hereinafter, selectively permits or prohibits entry of air through inlet 32.

After the contaminated air passes through the filter screen 30c, it exits through outlet 36 under the control of shutoff valve 38 into outlet line 90. A second line 41 attached to inlet 40 in the upper end of chamber 30 provides for the selective introduction of outside air through shutoff valve 42 for the purposes of backflushing as will be described hereinafter.

In the same fashion, the other branch line 48 delivers air into receiver 50 through inlet 52 under the control of valve 54. The air passes through filter screen 50c and through outlet 56 under the control of valve 58 into outlet line 90. Again, a separate line 61 provides for the delivery of outside air through inlet 60 under the control of valve 62 for the purposes of backflushing.

A crossover line 46 connects the dirty air chamber of receiver 30 with the dirty air chamber of receiver 50 through inlets 44,64. A crossover valve 70 selectively shuts off or allows the flow of air between the dirty air chambers of receivers 30,50, as will be described hereinafter. It is this crossover line 46 and valve 70, and the way in which the valves are controlled to provide for backflushing that lies at the heart of the invention.

Figure 4:
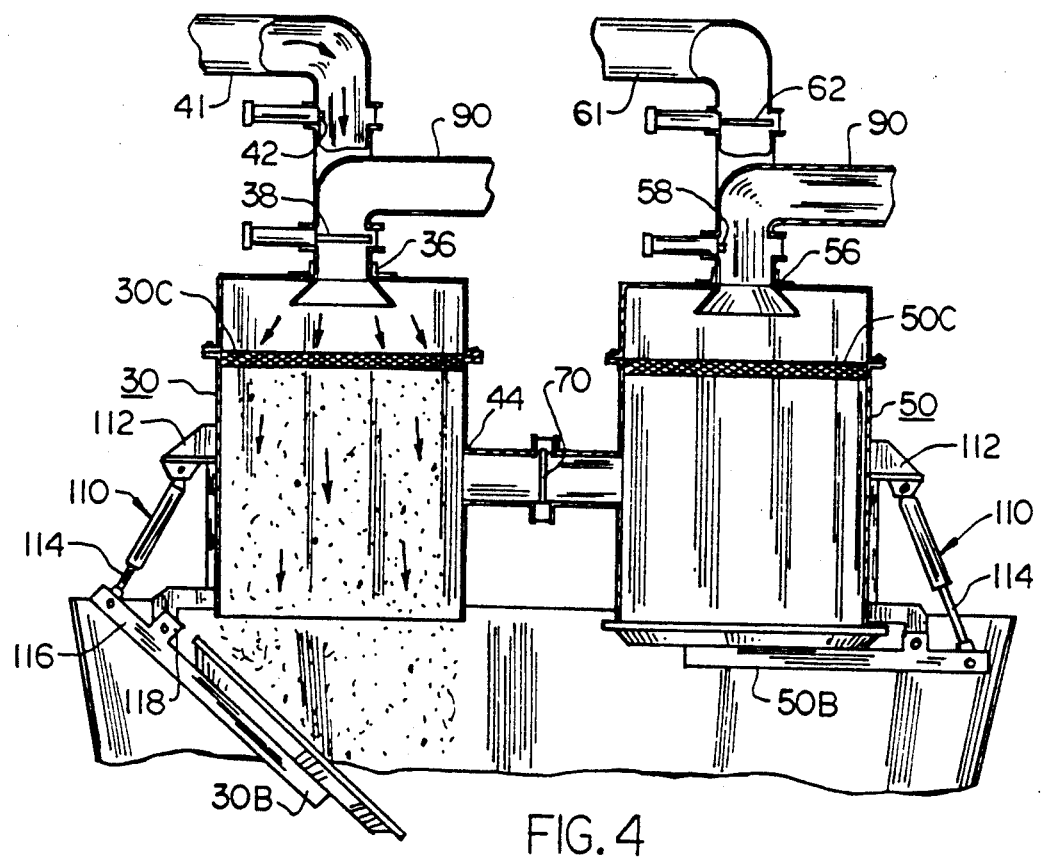
FIG. 4 is an enlarged longitudinal cross-sectional view taken through the receivers.

As better illustrated in FIG. 4, gates 30b,50b are controlled by an air cylinder 110. Air cylinder 110 is pivotally mounted at its upper end to a mounting bracket 112. The piston 114 of the air cylinder is pivotally mounted to one end of a control arm 116 which, in turn, is secured to gate 30b. The control arm 116 is also pivotally mounted to a support bracket 118 which mounts the control arm/gate assembly for its arcuate movement. The gate 50b of receiver 50 is mounted in the same way. When the gates are opened, the lint, waste and debris within the dirty air portion of the receiver thereabove are allowed to drop into collection hopper 80 therebelow.

OPERATION OF THE SYSTEM

In the normal operating cycle, as illustrated in FIG. 1, crossover valve 70 and outside air valves 42,62 are normally closed. At the same time, assuming receiver 30 is operating, inlet valve 34 and outlet valve 38 are open while the corresponding valves of receiver 50 are closed. Periodically, the flow of air is switched from receiver 30 to receiver 50. In such case, the inlet valve 34 and outlet valve 38 of receiver 30 are closed and the inlet valve 54 and outlet valve 58 of receiver 50 are open.

At selected times, in the operating cycle, it is necessary to dump the lint, fibers, waste material and other contaminants from the dirty air chambers of either receiver 30 or receiver 50. The dump cycle of receiver 30 will be discussed hereinbelow. As the dump cycle of receiver 50 is similar, it is not believed necessary to specifically discuss this cycle with respect to receiver 50.

When it is time to dump the contaminants from the dirty air chamber of receiver 30, the following sequence of events occur. Assume that the receiver 50 is operating and receiver 30 is waiting to be cleaned. At this time, valves 34,38,42 are all closed on receiver 30. At the same time, valves 54,58 of receiver 50 are open while valve 62 is closed. Also, of course, the crossover valve 70 is closed.

To dump the contents of the dirty chamber of receiver 30, first of all, valve 42 is opened to allow air from the outside into chamber 30 to break the vacuum existing therein. Gate 30b is opened to dump the fibers, waste and lint from within the chambers into hopper 80, then the gate 30b is closed. In the cycle, it is now time to backflush screen 30a.

In order to accomplish the backflushing, next close valve 42 and intake valve 54 of receiver 50. At the same time, the valves at all the pickup points are closed. The crossover valve 70 is then opened and after a delay of approximately 5 seconds, during which time the pump draws down both chambers to an equilibrium state, valve 42 is again opened, whereupon pump 100 then draws air in through inlet 40, down through screen 30c backflushing as it passes, through crossover line 46, back up through chamber 50, screen 50c and out through outlet 56 into the outlet line 90. After a prescribed time delay, valve 42 is closed, valve 70 is closed, valve 58 is closed, and valves 34,38 are opened. Now receiver 30 is operating in the normal fashion and receiver 50 is inoperative whereupon it can be cleaned when desired. At the appropriate time, the above process is reversed and repeated to dump receiver 50.

While a preferred embodiment is described in detail hereinabove, it is apparent that various changes and modifications might be made without departing from the scope of the invention which is set forth in the accompanying claims.

What is claimed is:

1. A method for collecting and separating air entrained solid constituents from an incoming airstream which delivers said solid constituents from one or more pickup points, said method comprising the steps of:
    a. generating a collection airstream from a plurality of collection points selectively and alternately through a plurality of filter chambers by means of a single high vacuum pump during normal operation;
    b. establishing a dump cycle periodically during said normal operation during which time each filter chamber is cleaned in succession;
    c. the cleaning in step (b) being effected by closing the collection airstream in the filter chamber being cleaned, dumping the accumulated constituents from said chamber, and generating a reverse airflow path through the filter screen of said filter chamber being cleaned which reverse airflow path is transferred to another of said filter chambers, through the filter screen thereof in the normal direction and or to said pump.

2. A filter system for collecting and separating air entrained solid constituents from an incoming airstream which transmits said constituents from one or more pickup points; said apparatus comprising:
    a. a pair of collection chambers and a normally closed crossover air passageway extending therebetween and communicating therewith, each of said filtration chambers including:
        i. a housing having a filter screen therein;
        ii. an air inlet on the upstream side of said filter screen, said air inlet having an inlet shutoff valve associated therewith for receiving said incoming airstream;
        iii. an air outlet on the downstream side of said filter screen, said air outlet having a shutoff outlet shutoff valve associated therewith;
        iv. a fresh air inlet on the downstream side of said filter screen, said fresh air inlet including a fresh air inlet shutoff valve associated therewith;
    b. duct means for delivering said incoming airstream substantially evenly to said upstream air inlets of said filter chambers;

c. a high vacuum pump having the capacity of generating a vacuum of 10-13 inches of mercury positioned downstream of said downstream air outlet;

d. means for delivering air from both of said downstream air outlets to said high vacuum pump;

e. a valve in said crossover air passageway for selectively opening and closing the air path between said chambers;

f. whereby backflushing of the filter screen in one filtration chamber may be effected by selective manipulation of the valves to (1) close both upstream air inlets, (2) close the downstream air outlet of one filtration chamber, (3) open the downstream fresh air inlet on said one filtration chamber, and (4) open said valve in the crossover air passageway, the high vacuum pump drawing in fresh air to the downstream side of said one filtration chamber, through the screen thereof in a reverse direction to backflush, through the crossover passageway, into and back through the screen of the other filtration chamber and onto the pump.

3. A filter system for collecting and separating air entrained solid constituents from an incoming airstream which transmits said constituents from one or more pickup points, said apparatus comprising:

a. a high vacuum pump, a plurality of separation chambers having a filter screen therein, and a crossover air passageway extending between and communicating with said separation chambers;

b. input means associated with said pump and collection chambers for normally generating an airflow path containing solid constituents entrained therein from a plurality of collection points through a common duct system and through said separation chambers substantially evenly during normal operation;

c. output means associated with said pump and collection chambers for delivering clean air from each of said collection chambers to said high vacuum pump;

d. a fresh air inlet entering each of said collection chambers downstream of said filter screen;

e. valve and control means associated with said input and output means, with said fresh air inlets, and with said crossover for selectively and sequentially backflushing said filter screens by closing the flow of air to said input means of both separation chambers, closing the flow of air to the output means of the separation chamber being cleaned, and opening the fresh air inlet to the separation chamber being cleaned, opening said crossover air passageway between said separation chambers, and generating a backflow of air through the filter screen of said one chamber, through said crossover air passageway, through said other air chamber, and on to said pump.

4. A filter receiver for separating air entrained solid constituents from an incoming airstream, said filtration chamber comprising:

a. a housing having a filter screen therein forming a collection chamber therebeneath;

b. a dirty air inlet in the side wall of said housing on the upstream side of said filter screen, said air inlet having a shutoff valve associated therewith for receiving said inclining airstream;

c. a clean air outlet in the top wall of said housing on the downstream side of said filter screen, said air outlet having a shutoff valve associated therewith;

d. a fresh air inlet in the top wall of said housing on the downstream side of said filter screen, said fresh air inlet including a shutoff valve associated therewith;

e. a bottom gate covering the bottom wall of said housing, said bottom gate being selectively opened to drop collected contaminating particles from said collection chamber thereabove; and f. a crossover outlet in the side of said housing upstream of said filter screen through which backflush air from said fresh air inlet exits during cleaning of the screen.

* * * * *